(No Model.)  2 Sheets—Sheet 1.

W. E. FORSTER.
CLUTCH MECHANISM.

No. 536,199. Patented Mar. 26, 1895.

Witnesses
Ed Hinkley.
W. J. Young.

Inventor
William E. Forster
By his Attorneys
E. K. & B. Phillips (No Model.) 2 Sheets—Sheet 2.

W. E. FORSTER.
CLUTCH MECHANISM.

No. 536,199. Patented Mar. 26, 1895.

Witnesses
Ed. Winkley.
W. J. Young.

Inventor
William E. Forster
By his Attorneys
E. K. & B. Phillips

UNITED STATES PATENT OFFICE.

WILLIAM E. FORSTER, OF LYNN, MASSACHUSETTS.

CLUTCH MECHANISM.

SPECIFICATION forming part of Letters Patent No. 536,199, dated March 26, 1895.

Application filed June 28, 1894. Serial No. 516,033. (No model.)

*To all whom it may concern:*

Be it known that I, WILLIAM E. FORSTER, a citizen of the United States, and a resident of Lynn, in the county of Essex and Commonwealth of Massachusetts, have invented a new and useful Improvement in Clutch Mechanisms, of which the following is a specification, reference being had to the drawings herewith submitted, forming a part thereof.

My invention relates generally to devices of the above class and more particularly to such devices adapted to impart to the driving shaft of a machine an intermittent motion from a constantly driven wheel turning loose thereon.

My invention consists of an internally and an externally toothed wheel rigidly united and turning loose on the driving shaft, a rigid arm projecting from the driving shaft, and the form and arrangement of the mechanism whereby said arm is engaged with and released from said wheels.

The object of my invention is to furnish a device of the above class that is positive and efficient in its operation and simple in construction.

My invention is illustrated by the accompanying drawings, in which—

Figure 1:
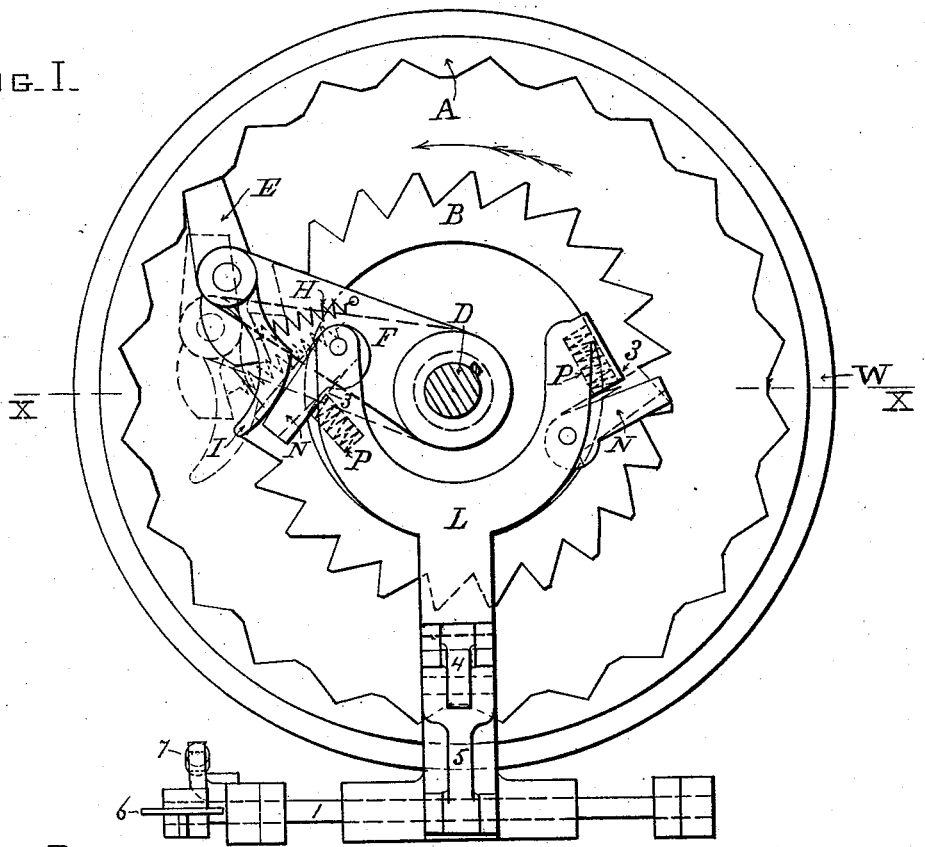
Figure 2:
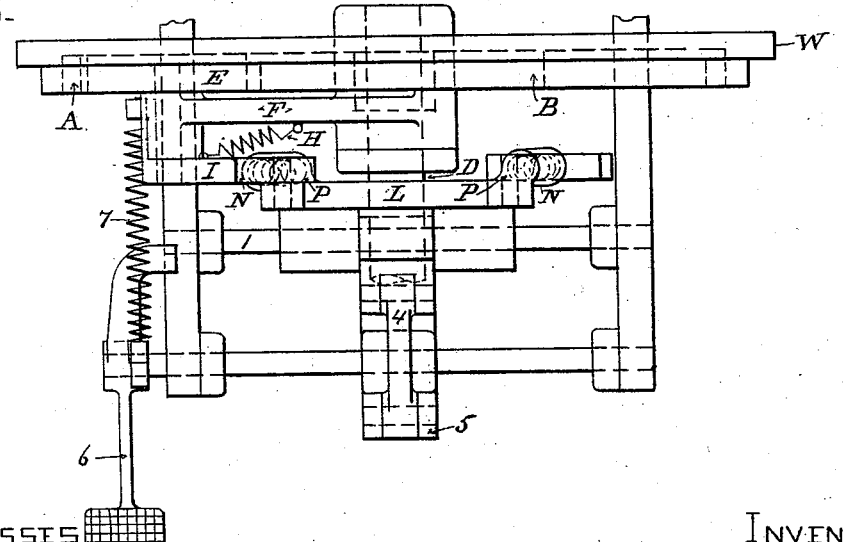
Figure 3:
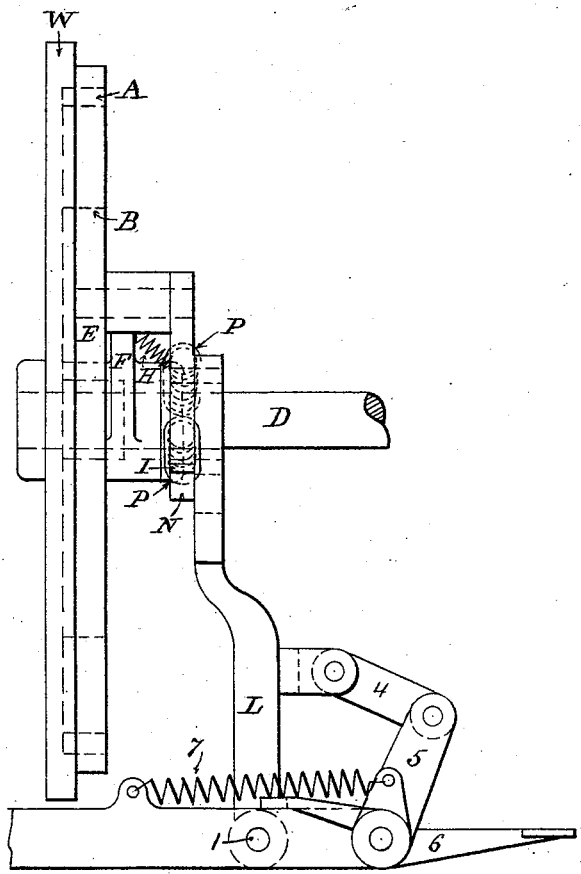
Figure 4:
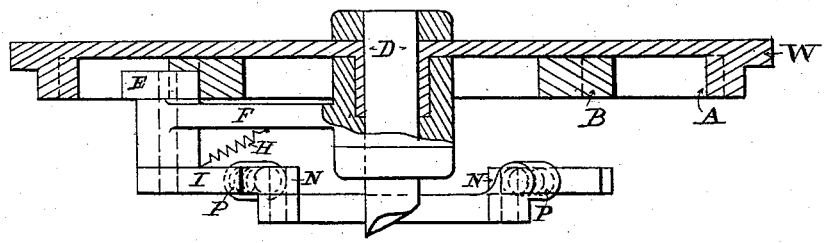

Figure 1 is a side elevation of device embodying same. Fig. 2 is a plan view; Fig. 3, an end view. Fig. 4 is a view taken partially in section on line X—X Fig. 1 and partially in plan.

Similar letters and figures of reference refer to similar parts throughout the several views.

In the drawings, A represents an internally toothed wheel and B an externally toothed wheel, which may conveniently be united in a single casting forming the wheel W, with two rows of oppositely cut teeth.

D represents the driving shaft of the machine to which the device is applied.

The wheel W turns loosely upon the shaft D, being held in position thereon by suitable collars or other suitable device and may be driven by a belt or provided with external teeth and driven by a pinion.

Adjacent to the wheel W an arm F projects from the shaft D which is rigidly connected therewith so that the shaft D can be rotated thereby.

The arm F is provided with a pawl E pivotally mounted thereon and held thereby between the two rows of teeth on the wheel W, its arrangement being such that when turned on its pivot toward a position radial to wheel W it engages with a tooth in each row of teeth and locks the arm F to the wheel W so that it will revolve therewith, and when turned toward a position in line with tangent to wheel W it disengages and clears both rows of teeth. (See Fig. 1.)

To the pawl E and arm F is secured a spring H, the tendency of which is to bring the pawl E into a radial position and which normally holds the pawl E in engagement with the teeth on wheel W as above set forth.

To the pawl E is connected a tripper I, preferably upon the opposite side of the arm F which turns with the pawl E, the function of which is to disengage the pawl E as hereinafter described. The tripper I is preferably cam shaped substantially as shown.

L represents a swinging arm, swinging with a rod 1 mounted in suitable bearings in the frame of the machine. As shown in the drawings the upper end of the arm L is forked and embraces shaft D each of its prongs carrying a dog N pivotally mounted thereon and supported by a spring P, against the resistance of which it is brought to a solid bearing against a shoulder 3 on the arm L. The arrangement is such that when the arm L is substantially vertical as the arm F revolves with the wheel W the tripper I strikes the dog N and is turned thereby toward a position in line with tangent to wheel W and the pawl E turning with the tripper I is disengaged from the teeth on wheel W.

When the arm L is swung back out of a vertical position the tripper I clears the dog N and the spring H immediately brings the pawl E into engagement with the teeth on the wheel W.

The function of the spring P is to insure good clearance of the pawl E—a very important function in the operation of the device. If the spring P is omitted and the dog N rigid when the tripper I comes in contact therewith, the pawl E disengages, but (especially after parts become worn) does not secure sufficient clearance to prevent contact with the teeth which makes an objectionable clicking noise and further causes a vibration of the pawl E, which prevents its positive engagement when the tripper I is released.

It will be noted that when the tripper I strikes the dog N it brings it to a solid bearing on the shoulder 3 against the resistance of spring P, which acts after the release of pawl E to turn the same farther toward a tangential position. The spring P is strong enough to overcome the resistance of the spring H.

The tripper I is preferably made curved or cam shaped in that portion coming in contact with the dog N, to prevent binding thereon and insure its easy operation thereby.

The dogs N are oppositely arranged upon the arm L one above and the other below its associated shoulder 3 so that either may be suitably presented to the tripper I rotating in the same direction.

By means of the connecting levers 4, and 5 or suitable connecting mechanism the arm L may be swung back, so that the tripper I clears the dog N, by a treadle 6 suitably mounted in the frame of the machine. A suitably placed spring 7 is provided for returning arm L to its original position when the treadle 6 is released.

The direction of rotation of wheel W as my device is illustrated in the drawings is in the direction of the arrow head.

To use my invention the operator (power being applied to rotate wheel W) places his foot upon the treadle 6 and depresses same until the tripper I clears the dog N. The pawl E is then thrown into engagement with the teeth upon wheel W and the rotation of the driving shaft D commences. The operator immediately releases the treadle 6, and, the arm L being restored to its original position by spring 7, when the tripper I reaches the other dog N, the pawl E is thrown out of engagement and the rotation of the shaft D stops. When desired to secure a complete rotation of the shaft D, without intermission one of the dogs N and its associated spring may be omitted.

Having thus described my invention and the method of using same, I claim as novel, and desire to secure by Letters Patent, in a clutch mechanism—

1. The combination of an internally and an externally toothed wheel rigidly connected and turning loose upon the driving shaft, a rigid arm projecting from the driving shaft, a spring pressed pawl and connected tripper mounted upon said arm, a swinging arm embracing the driving shaft, a dog upon each side of the driving shaft mounted upon said arm and moved thereby to and from a position in the path of the tripper substantially as described.

2. The combination of an internally and an externally toothed wheel rigidly connected and turning loose on the driving shaft, a rigid arm projecting from the driving shaft a spring pressed pawl and connected tripper mounted upon said arm, a swinging arm and a spring supported dog mounted thereon and moved thereby to and from a position in the path of the tripper substantially as described.

3. The combination of an internally and an externally toothed wheel rigidly connected and turning loose upon the driving shaft, a rigid arm projecting from the driving shaft, a spring pressed pawl and connected tripper mounted on said arm, a swinging arm embracing the driving shaft, and a spring supported dog upon each side of the driving shaft mounted upon said arm and moved thereby to and from a position in the path of the tripper substantially as described.

4. The combination of an internally and an externally toothed wheel rigidly connected and turning loose upon the driving shaft, a rigid arm projecting from the driving shaft, a spring pressed pawl and connected cam shaped tripper mounted upon said arm, a swinging arm and a dog mounted thereon and moved thereby to and from a position in the path of the tripper substantially as described.

Dated at Lynn, June 11, 1894.

WILLIAM E. FORSTER.

Witnesses:
ERASTUS E. WINKLEY,
EUGENE J. MOYINHAN.